United States Patent
Nabar

(10) Patent No.: US 8,467,481 B1
(45) Date of Patent: *Jun. 18, 2013

(54) CHANNEL ESTIMATION FOR A WLAN THROUGH INCREASED USE OF PREAMBLE

(75) Inventor: Rohit Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/405,904

(22) Filed: Feb. 27, 2012

Related U.S. Application Data

(63) Continuation of application No. 11/895,164, filed on Aug. 23, 2007, now Pat. No. 8,126,090.

(60) Provisional application No. 60/823,975, filed on Aug. 30, 2006.

(51) Int. Cl.
*H04L 27/00* (2006.01)

(52) U.S. Cl.
USPC .......................................... 375/340; 375/316

(58) Field of Classification Search
USPC .................................. 375/316, 340, 262, 260
See application file for complete search history.

(56) References Cited

U.S. PATENT DOCUMENTS

| 8,126,090 B1* | 2/2012 | Nabar ........................... 375/340 |
| 2004/0196926 A1 | 10/2004 | Chien et al. |
| 2004/0240376 A1 | 12/2004 | Wang et al. |
| 2004/0258025 A1 | 12/2004 | Li et al. |
| 2005/0180386 A1 | 8/2005 | Hansen et al. |
| 2005/0185738 A1 | 8/2005 | Gaikwad |
| 2006/0114981 A1 | 6/2006 | Ghosh et al. |
| 2007/0002823 A1 | 1/2007 | Skov Andersen et al. |
| 2007/0025474 A1 | 2/2007 | Moorti et al. |
| 2007/0047666 A1 | 3/2007 | Trachewsky |
| 2007/0058623 A1 | 3/2007 | Moorti et al. |
| 2007/0189408 A1 | 8/2007 | Waxman |
| 2008/0317149 A1* | 12/2008 | Sondur et al. ................. 375/260 |
| 2009/0028106 A1 | 1/2009 | Hansen et al. |
| 2009/0262859 A1 | 10/2009 | Trachewsky et al. |
| 2010/0086013 A1 | 4/2010 | Pare, Jr. et al. |
| 2012/0127899 A1* | 5/2012 | Ketchum et al. ............. 370/310 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.
802.11n; IEEE P802.11-04/0889r6; Wireless LANs, TGn Sync Proposal Technical Specification; May 2005; 131 pages.

* cited by examiner

*Primary Examiner* — Emmanuel Bayard

(57) ABSTRACT

A method and system for improving channel estimation in a wireless device is disclosed. Aspects of the exemplary embodiment include receiving a data packet wirelessly transmitted from a transmitter, the packet including a preamble portion and a data portion containing data, wherein the preamble portion includes at least one training field and a second field; performing a first channel estimation using the training field; and using the second field to refine the first channel estimation.

18 Claims, 3 Drawing Sheets

CHANNEL ESTIMATION FOR A WLAN THROUGH INCREASED USE OF PREAMBLE

CROSS-REFERENCE TO RELATED APPLICATIONS

This application is a continuation of U.S. application Ser. No. 11/895,164, filed Aug. 23, 2007, which claims the benefit of provisional Patent Application Ser. No. 60/823,975, filed Aug. 30, 2006. The disclosures of the applications referenced above are incorporated herein by reference.

BACKGROUND

A commonplace type of WLAN system is the 802.11 an IEEE (Institute of Electrical and Electronics Engineers) standard. Up until 2004, 802.11 wireless devices had a single antenna (some devices had two antennas, but there was only one set of components to process the signal, or RF chain). 802.11 task group N (TGn) has recently proposed an 802.11n standard that has the goal of increasing the peak data throughput transmitted by a wireless multiple-input/multiple-output (MIMO) device to 100 Mbps. The basis of MIMO operation is to provide 11n devices with multiple radio interfaces to allow the devices to send data on different channels at the same time in order to achieve greater transmit/receive data rates than the pre-11n devices.

In a WLAN, information is transmitted between a transmitter and a receiver through the transmission of encoded data packets. These data packets are then decoded at the receiver based on channel state information (CSI). The more accurate the CSI, the more accurate will be the decoding precision, and hence lower the packet error rate. Because a WLAN may suffer from impairments such as delay spread, thermal noise, and bandwidth fluctuations due to a shared medium with multiple users in a mobile environment, a perfect CSI is never known to the receiver. Instead, the receiver must rely on channel estimation. In a WLAN, such as 802.11n, channel estimation is performed at the receiver through training sequences that are transmitted prior to the data. The training sequences are pre-determined and known to the receiver, enabling the receiver to estimate the CSI. For example, in a WLAN 802.11n system, the packet structure includes a preamble that is followed by the data. The preamble includes several types of fields, including several training fields.

Although the other types of fields in the preamble include a variety of information, currently, channel estimation performed at the receiver is restricted to use of only the training fields of the packet preamble. Accordingly, by limiting the channel estimation to only use of the training fields of the preamble, the accuracy of the channel estimation may be likewise limited.

BRIEF SUMMARY

The present invention provides a method and system for improving channel estimation in a wireless device. Aspects of the exemplary embodiment include receiving a data packet wirelessly transmitted from a transmitter, the packet including a preamble portion and a data portion containing data, wherein the preamble portion includes at least one training field and a second field; performing a first channel estimation using the training field; and using the second field to refine the first channel estimation.

According to the method and system disclosed herein, receiving wireless devices are no longer limited to using only the training fields of packet preambles for calculation of channel estimation, thereby improving the accuracy of the channel estimate, and consequently the accuracy of the decoding of the data.

DETAILED DESCRIPTION OF THE INVENTION

The present invention relates to improving the accuracy of channel estimates in a WLAN receiver through increased use of packet preambles. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The preferred embodiment provides a method and system for increasing the accuracy of channel estimates for use in wireless communication receiver devices. According to the exemplary embodiments disclosed herein, estimating the channel at the receiver when a transmitted packet is received is not restricted only to the training fields of the packet preamble. Instead, additional portions of the preamble may be used to improve the quality of the channel estimation. By increasing the accuracy of the channel estimation, the accuracy of the receiver's decoding is increased, which in turn, may lower the packet error rate.

The exemplary embodiments will be described in terms of improved channel estimation using Greenfield access mode in IEEE 802.11n WLAN systems. However, one with ordinary skill in the art will readily recognize that the exemplary embodiments may be used with other types of access modes and other types of wireless communication systems in which packets are transmitted with preambles having various fields besides a training field. The exemplary embodiments will also be described in the context of particular methods having certain steps. However, the method and system operate effectively for other methods having different and/or additional steps not inconsistent with the exemplary embodiments.

Figure 1:
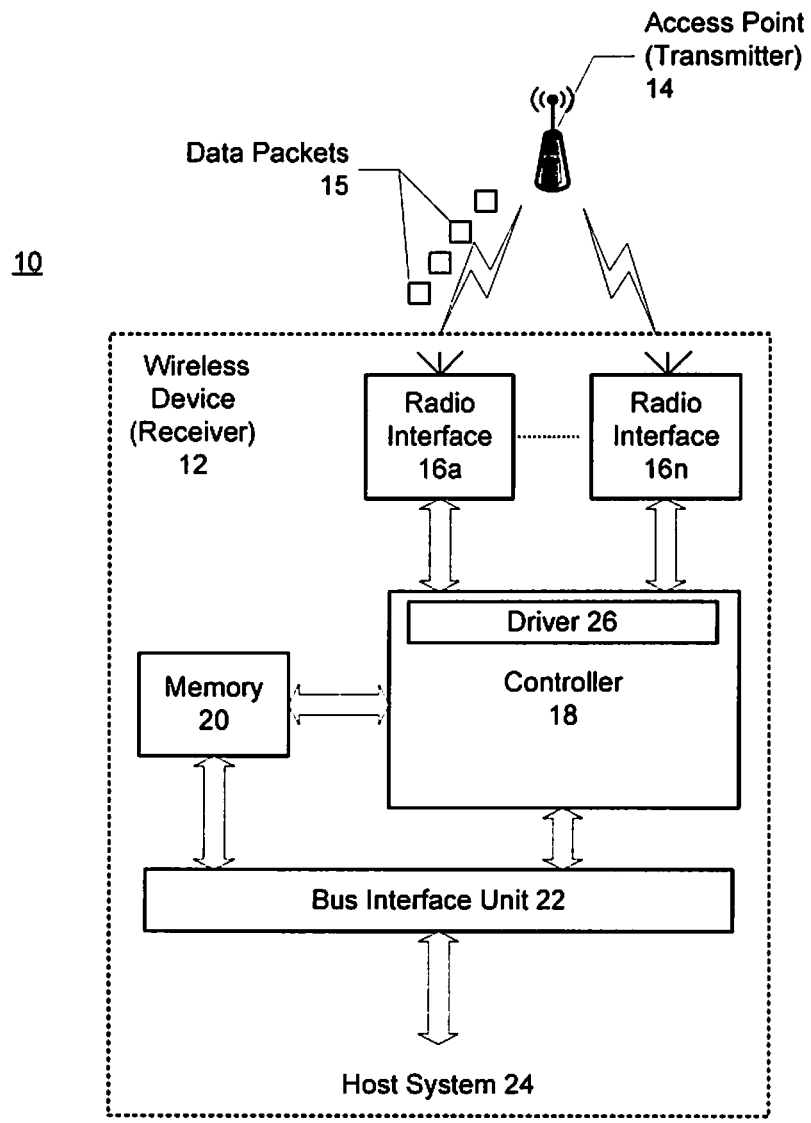
FIG. 1 is a block diagram illustrating an exemplary wireless communication system.

FIG. 1 is a block diagram illustrating an exemplary wireless communication system. The wireless communication system 10 includes a wireless device 12 that communicates with another wireless device, for example, an access point (AP) 14. In one exemplary embodiment, the wireless device 12 comprises a MIMO device. In addition, the wireless device 12 may be a network device or client station (STA) used in a desktop/portable computer for communication. The access point 14 is the device that connects multiple wireless devices 12 together to form a wireless network and permits wireless devices 12 to communicate over the network or to each other. An example access point 14 is a router that has a broadband network connection. Several access points 14 can link together to form a larger network that allows roaming. The wireless device 12 and the access point 14 communicate through the transmission of signals in the form of streams of encoded data packets 15 over one or more radio frequency (RF) channels. In the context of referring to different layers in a particular protocol reference model, packets 15 may sometimes be referred to as frames.

Although both the wireless device 12 and the access point 14 are capable of both transmitting and receiving signals, for the purposes of this disclosure, the wireless device 12 will be described in terms of being the receiver that receives data packets 15 transmitted from the access point 14.

The wireless device 12 includes one or more independent radio interfaces 16*a* and 16*n* (commonly referred to as radio interfaces 16) for processing one or more data streams, a controller 18 coupled to the radio interfaces 16, a memory 20 coupled to the controller 18. and a bus interface unit 22 coupled to the controller 18 and to the memory 20 for transmitting data to a host 24 over a host system bus.

The radio interfaces 16 are independent from each other because each radio interface 16 has its own antenna and RF chain. Each RF chain and its corresponding antenna are responsible for transmitting and processing a data stream. A single frame of data can be broken up and multiplexed across multiple data streams and reassembled at the receiver, which may have the benefits of resolving multipath interference and improving the quality of the received signal. In one embodiment, the devices in the wireless communication system 10 may have a different number of receive antennas than transmit antennas. Each of the radio interfaces 16 may utilize 1 to N radio channels. Each of the channels may be used simultaneously for data transmission. The wireless device 12 may also include multiple operating modes including one or more data modes corresponding to the number of available radio interfaces 16.

The driver 26 is software or firmware that controls the radio interfaces 16 and can process the data if needed. The driver 26 is executed by the controller 18. The controller 18 may comprise an ASIC, a DSP or other type of processor. The memory 20 stores the incoming and outgoing data packets 15 and any other data needed by the driver 26. The bus interface unit 22 transfers data between the host system 24, and the controller 18 and the memory 20.

In operation, when the wireless device 12 receives one or more data packets 15, the driver 26 decodes the data packets 15 based on channel state information (CSI). Because an exact CSI cannot be determined by the receiving wireless device 12, the driver 26 conventionally performs channel estimation through training sequences that are transmitted in the data packets 15 prior to the actual data within the packets 15.

Figure 2:
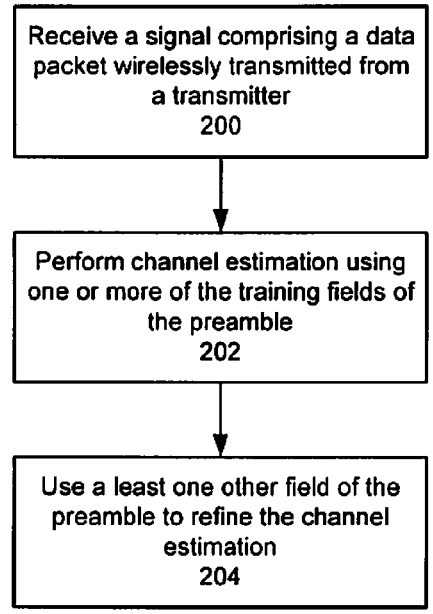
FIG. 2 is a flow diagram illustrating a process performed by the driver for improving channel estimation in a wireless device in accordance with the exemplary embodiment.

FIG. 2 is a flow diagram illustrating a process performed by the driver 26 for improving channel estimation in a wireless device 12 in accordance with the exemplary embodiment. Referring to both FIGS. 1 and 3, the process begins when the wireless device 12 receives a signal comprising a data packet 15 wirelessly transmitted from a transmitter, such as access point 14 (block 200). Depending on the type of wireless protocol and the device's mode of operation within that protocol, the format of the data packets 15 may vary. However, typically, the packet format includes a preamble portion followed by a data portion containing actual data.

The preamble contains information essential to establish a link with the transmitter via a radio frequency (RF) channel through gain control, synchronization, channel estimation, etc. In some systems, the same preamble may be transmitted on all the device antennas, but with small time shifts relative to the others. The preamble may include several types of fields, including one or more training fields used traditionally for estimation, and at least one other type of field. The preamble in most modes of the WLAN 802.11 standard, for example, includes both short and long training fields, and a signal field.

Figure 3:
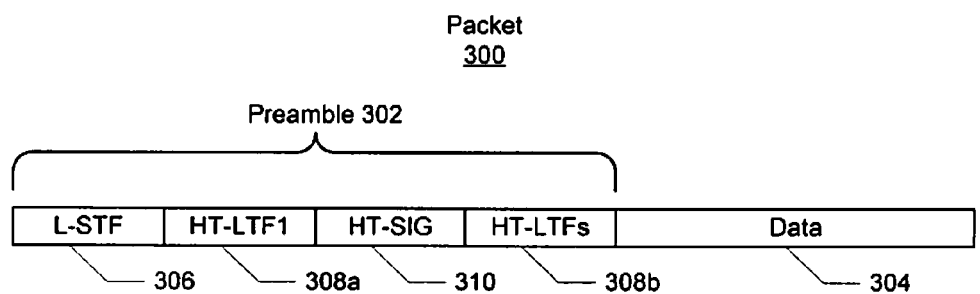
FIG. 3 shows an exemplary packet format as proposed by the WLAN 802.11n system in a mode of operation referred to as Greenfield mode.

FIG. 3 shows an exemplary packet format as proposed by the WLAN 802.11n system in a specific mode of operation referred to as Greenfield mode. A packet 300 in Greenfield mode includes a preamble 302 preceding a data field 304 (which contains a physical sub-layer data unit). The preamble 302 includes a Legacy Short Training Field (L-STF) 306; a High Throughput Long Training Field (HT-LTF) 308*a*; a High Throughput Signal Field (HT-SIG) 310; and several (e.g., 4) additional High Throughput Long Training Fields (HT-LTF's) 308*b*. Other fields not shown that may be utilized in the preamble in other modes of WLAN 802.11n include a Legacy Long Training Field (L-LFT), a Legacy Signal Field (L-SIG), and a High Throughput Short Training Field (HT-STF).

The Legacy Short Training Field 306 is typically used by the receiver for synchronization and automatic gain control (AGC). The HT-Signal Field 310 provides information that helps to decode the data in the data field 304, such as the modulation, coding rate, and number of spatial streams.

The training portion of the preamble 302 comprising the HT-Long Training Fields 308*a* and 308*b* (collectively referred to as training fields 308), contains the training sequences traditionally used to obtain CSI through channel estimation at the receiver, which is then used to decode the data field 304. As described above, traditionally channel estimation has in the past been restricted to use of only the training portion of the preamble 302, i.e., the training fields 308.

Referring again to FIG. 2, the driver 26 also performs channel estimation using one or more of the training fields 308 of the preamble 302 (block 202). However, in accordance with an exemplary embodiment, the driver 26 also uses a least one other field of the preamble 302 to refine the channel estimation (block 204).

According to the exemplary embodiment, the other field of the preamble 302 used to refine the initial channel estimates is the HT-SIG (hereinafter signal field) 310. The signal field 310 contains information necessary for enabling the receiving wireless device 12 to correctly decode the data 304. The signal field 310 is particularly suitable for channel estimation because the signal field 310 is encoded (i.e., digitally modulated) with a high strength code and can very reliably be decoded at the receiver over a wide range of channel conditions. More specifically, the signal field 310 is encoded using Phase-shift keying (PSK) and also includes a cycle redundancy check (CRC). Even if there are errors in the channel estimate using the training fields 308, the signal field 310 is almost always error-free.

According to the exemplary embodiment, once the receiver decodes the signal field 310 correctly, the receiver can re-encode the signal field 310 to reconstruct the signal that was transmitted, and in effect, provide a longer training sequence. Once the signal field 310 has been successfully reconstructed, the receiver can use the signal field 310 to compute a second channel estimation that may be used to refine the initial channel estimation computed from the long training fields. According to one embodiment, the initial channel estimation may be refined by combining (e.g., averaging) the initial channel estimation with the second channel estimation, providing the refined channel estimation that is used to decode the data 304.

Figure 4:
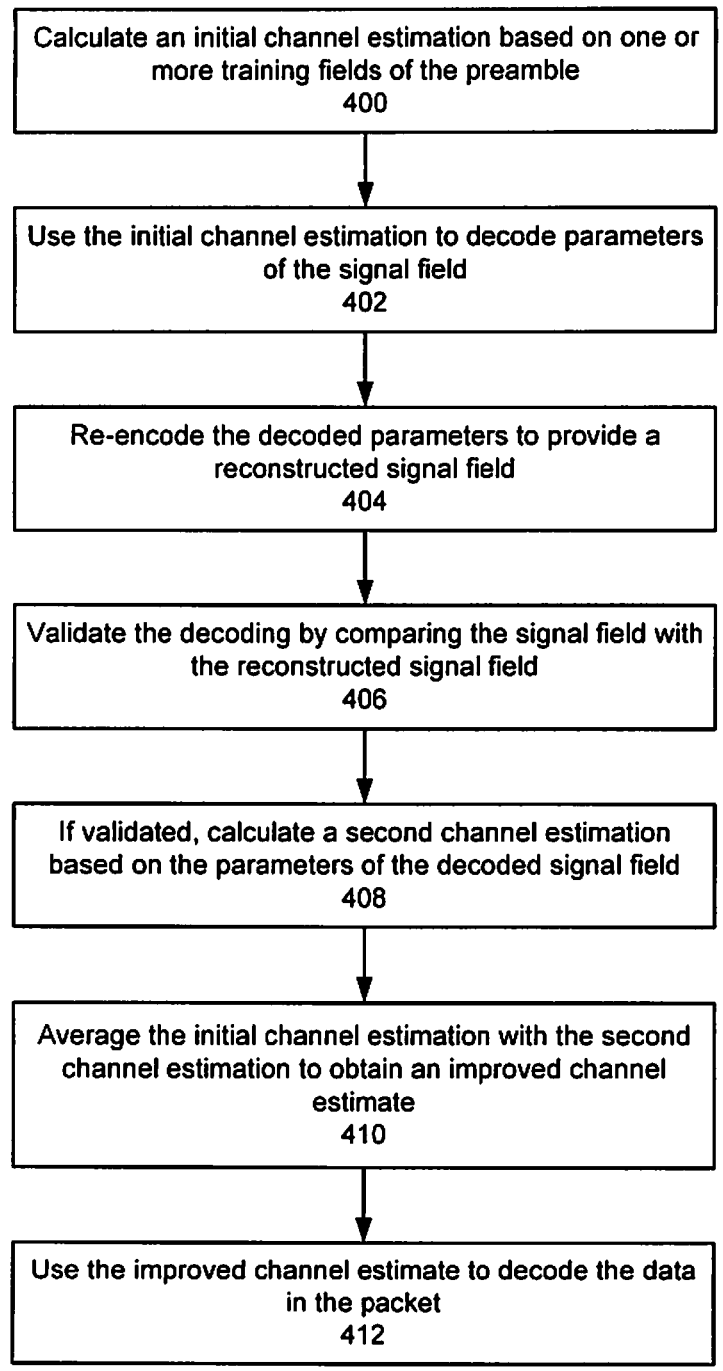
FIG. 4 is a flow diagram illustrating the process performed by the driver for providing an improved the channel estimate in further detail according to one exemplary embodiment.

FIG. 4 is a flow diagram illustrating the process performed by the driver 26 for providing an improved the channel estimation in further detail according to one exemplary embodiment. The process begins by calculating the initial channel estimation based on one or more training fields 308 of the preamble 302 (block 400). In one embodiment, the initial channel estimation may be determined based on only the first long training field (HT-LTF1) 308*a*. The initial channel estimation may be calculated from the training field(s) 308 using conventional techniques, the details of which are well-known to those of ordinary skill in the art.

After calculating the initial channel estimation, the driver 26 uses the initial channel estimation to decode parameters of the signal field 310 (block 402). The decoded parameters are re-encoded (using the same type of encoding originally used to encode the signal field 310) to provide a reconstructed signal field (block 404). The decoding is validated by comparing the signal field 310 with the reconstructed signal field (block 406). If validated, the driver 26 calculates a second channel estimation based on the parameters of decoded signal field 310 (block 408). In one embodiment, the second channel estimation is calculated using the same conventional techniques used to calculate the initial channel estimation. The driver 26 then averages the initial channel estimation with the second channel estimation to obtain an improved channel estimate (block 410). In another embodiment, the initial channel estimation may be refined by the second channel estimation using a weighted average. The improved channel estimate is then used to e decode the data 304 in the packet 300 (block 412).

Because the averaged channel estimation is based on both the long training fields 308 in addition to another field of the preamble 302, the averaged channel estimation should increase the accuracy of CSI estimation at the receiver. The more accurate the CSI estimation, the more accurate the decoding of the data 304, and hence lower the packet error rate. Accordingly, improving channel estimation by performing the estimates using the training fields 308 as well as another field of the preamble 302 accordance with the exemplary embodiments may result in a decoding performance gain of approximately 1 dB.

In the process above, the signal field 308 is encoded and then re-encoded to obtain the averaged channel estimation prior to the driver 26 decoding the data 304. According to an alternative embodiment, the signal field 310 is used even as the data 304 is being processed. In this embodiment, the initial channel estimation is first obtained and the signal field 308 is then decoded. After the signal field 308 is decoded, the decoding of the data 304 is commenced. Any free cycles encountered during the decoding of the data 304 is then used to obtain channel estimations based on the decoded signal field, which together with the initial channel estimation are used to provide the refined channel estimation. The refined channel estimation is then used for the decoding of the remaining data 304, thereby increasing accuracy of the channel estimation as the data 304 is being processed.

In another embodiment, another preamble field other than the signal field 310 may be used to augment the channel estimation obtained from the training fields 308. For example, a short training field may be used to improve channel estimation, such as the Legacy Short Training Field (L-SFT) 306 used in Greenfield mode. Typically, the short training field is used to achieve standardization or to adjust the gain. However, the short training field could be used in exemplary embodiments by using half of the short training field to achieve synchronization or to adjust gain, and then using the other half to obtain the second channel estimation.

In yet another embodiment, some mixed operating mode packet formats may include a guard area in-between the signal field 310 and the long training field 308 in the preamble. Typically, a modulator simply removes the guard area. However, the guard area contains just a copy of the last few samples of the long training field 308. Accordingly, additional use can be made of the guard area along with the signal field 310 in addition to the long training field to generate the refined channel estimation.

A method and system for improving channel estimation for WLANs through increased use of preamble has been disclosed. Exemplary embodiments have been provided that describe how the preamble 302 may be additionally leveraged beyond use of the training fields for improved CSI estimation at the receiver. The embodiments are not limited to the WLAN Greenfield mode of operation or limited to using specifically the signal field 310 for improved channel estimation. In general, additional use of the preamble (not restricting CSI estimation to the LTF), under appropriate conditions, can improve CSI estimation accuracy considerably and reduce the decoding error.

The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A system, comprising:
   a receiver configured to receive a packet including a preamble portion, wherein the preamble portion includes (i) a short training field and (ii) a long training field; and
   a controller configured to:
      generate a first channel estimate based on the long training field,
      generate a second channel estimate based on the short training field, and
      generate a third channel estimate based on each of (i) the first channel estimate and (ii) the second channel estimate.

2. The system of claim 1, wherein the controller is configured to decode data in a data portion of the packet based on the third channel estimate.

3. The system of claim 1, wherein the controller is configured to generate the third channel estimate based on a function of the first channel estimate and the second channel estimate.

4. A system, comprising:
   a receiver configured to receive a packet including a preamble portion, wherein the preamble portion includes (i) a plurality of long training fields and (ii) a signal field located between two of the plurality of long training fields; and a controller configured to
generate a first channel estimate based on one of the plurality of long training fields,
generate a second channel estimate based on the signal field, and
generate a third channel estimate based on each of (i) the first channel estimate and (ii) the second channel estimate.

5. The system of claim 4, wherein:
the preamble portion further comprises a guard area between the signal field and one of the plurality of long training fields, and
the controller is further configured to generate the third channel estimate using the guard area.

6. The system of claim 4, wherein the controller is configured to decode data in a data portion of the packet based on the third channel estimate.

7. The system of claim 4, wherein the controller is configured to generate the third channel estimate based on a function of each of (i) the first channel estimate and (ii) the second channel estimate.

8. The system of claim 4, wherein the controller is further configured to:
decode the signal field based on the first channel estimate;
re-encode the decoded signal field to generate a reconstructed signal field;
verify that the reconstructed signal field has been correctly reconstructed by comparing the signal field to the reconstructed signal field; and
generate the second channel estimate based on the decoded signal field.

9. The system of claim 8, wherein the controller is further configured to:
subsequent to decoding the signal field, begin decoding data in a data portion of the packet based on the decoded signal field;
generate the second channel estimate based on the decoded signal field using a plurality of free cycles encountered during decoding of the data; and
subsequent to generating the third channel estimate based on the first channel estimate and the second channel estimate, decode remaining data using the third channel estimate.

10. A method, comprising:
receiving, at a receiver, a packet including a preamble portion, wherein the preamble portion includes (i) a short training field and (ii) a long training field;
generating a first channel estimate based on the long training field;
generating a second channel estimate based on the short training field; and
generating a third channel estimate based on the first channel estimate and the second channel estimate.

11. The method of claim 10, further comprising decoding data in a data portion of the packet based on the third channel estimate.

12. The method of claim 10, further comprising generating the third channel estimate based on a function of the first channel estimate and the second channel estimate.

13. A method, comprising:
receiving, at a receiver, a packet including a preamble portion, wherein the preamble portion includes (i) a plurality of long training fields and (ii) a signal field located between two of the plurality of long training fields;
generating a first channel estimate based on one of the plurality of long training fields;
generating a second channel estimate based on the signal field; and
generating a third channel estimate based on each of (i) the first channel estimate and (ii) the second channel estimate.

14. The method of claim 13, wherein the preamble portion further comprises a guard area between the signal field and one of the plurality of long training fields, the method further comprising generating the third channel estimate using the guard area.

15. The method of claim 13, further comprising decoding data in a data portion of the packet based on the third channel estimate.

16. The method of claim 13, further comprising generating the third channel estimate based on a function of each of (i) the first channel estimate and (ii) the second channel estimate.

17. The method of claim 13, further comprising:
decoding the signal field based on the first channel estimate;
re-encoding the decoded signal field to generate a reconstructed signal field;
verifying that the reconstructed signal field has been correctly reconstructed by comparing the signal field to the reconstructed signal field; and
generating the second channel estimate based on the decoded signal field.

18. The method of claim 17, further comprising:
subsequent to decoding the signal field, decoding data in a data portion of the packet based on the decoded signal field;
generating the second channel estimate based on the decoded signal field using a plurality of free cycles encountered during decoding of the data; and
subsequent to generating the third channel estimate based on the first channel estimate and the second channel estimate, decoding remaining data using the third channel estimate.

* * * * *